Jan. 30, 1934.    F. H. BENGE    1,945,413
APPARATUS FOR PRODUCING SEGMENTAL RIMS
Filed March 25, 1930    12 Sheets-Sheet 1

Inventor:-
Frank H. Benge
by his Attorneys
Howson & Howson

Jan. 30, 1934.  F. H. BENGE  1,945,413
APPARATUS FOR PRODUCING SEGMENTAL RIMS
Filed March 25, 1930  12 Sheets-Sheet 2

Inventor:—
Frank H. Benge
by his Attorneys
Howson & Howson

Jan. 30, 1934.  F. H. BENGE  1,945,413
APPARATUS FOR PRODUCING SEGMENTAL RIMS
Filed March 25, 1930   12 Sheets-Sheet 3
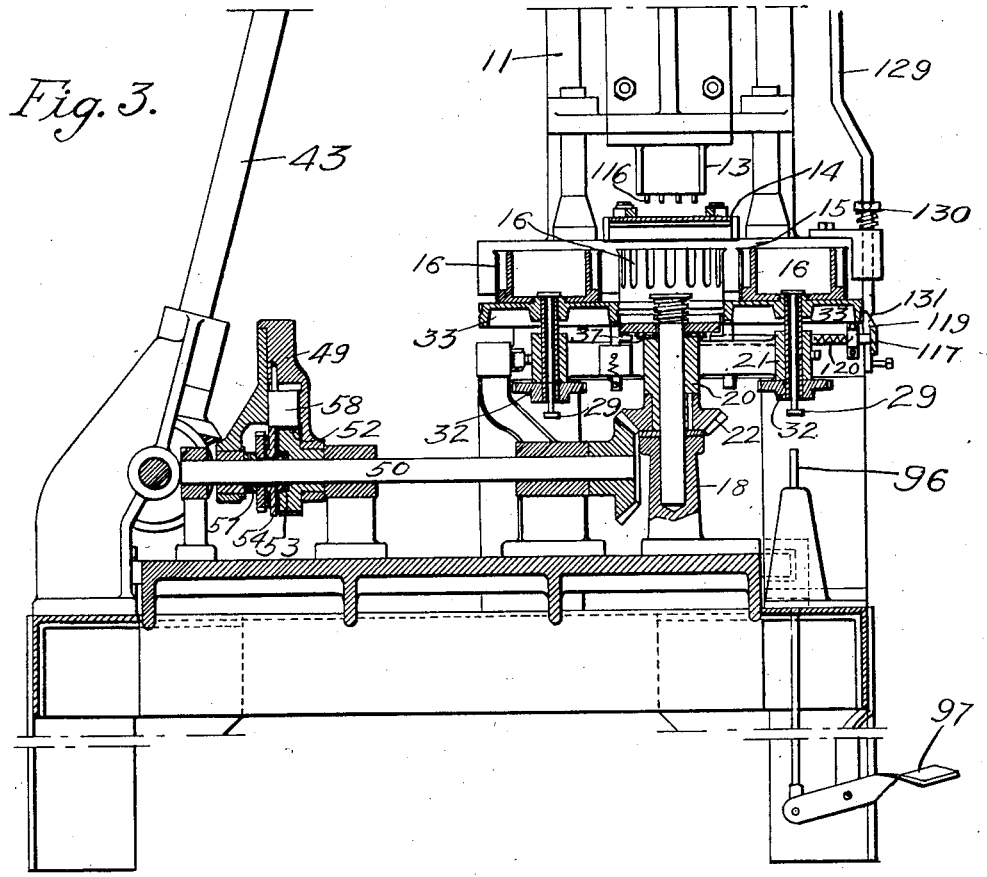
Fig. 3.
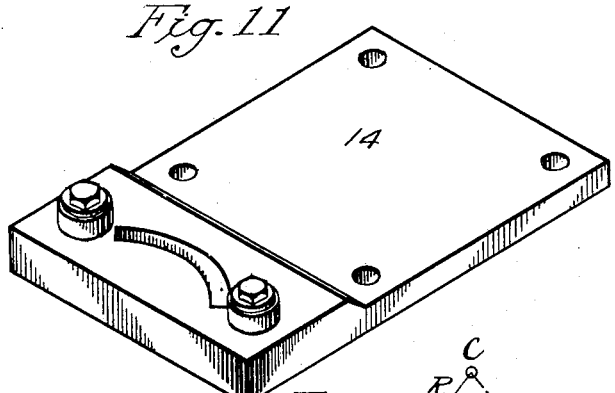
Fig. 11
Fig. 12ª
Fig. 12
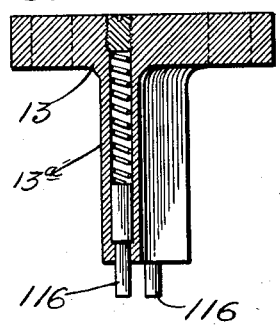
Fig. 13.
Inventor:—
Frank H. Benge
by his Attorneys
Howson & Howson

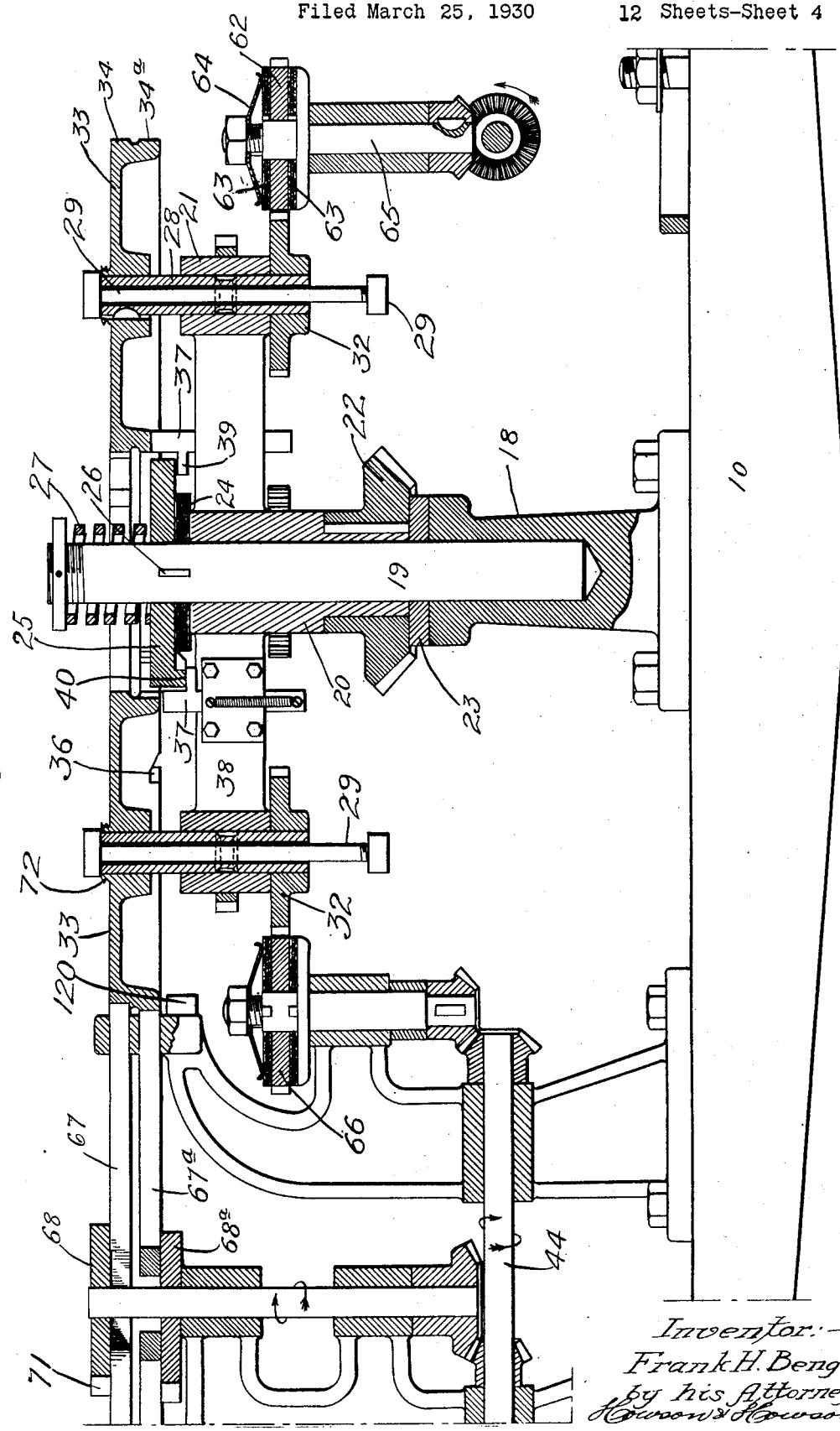

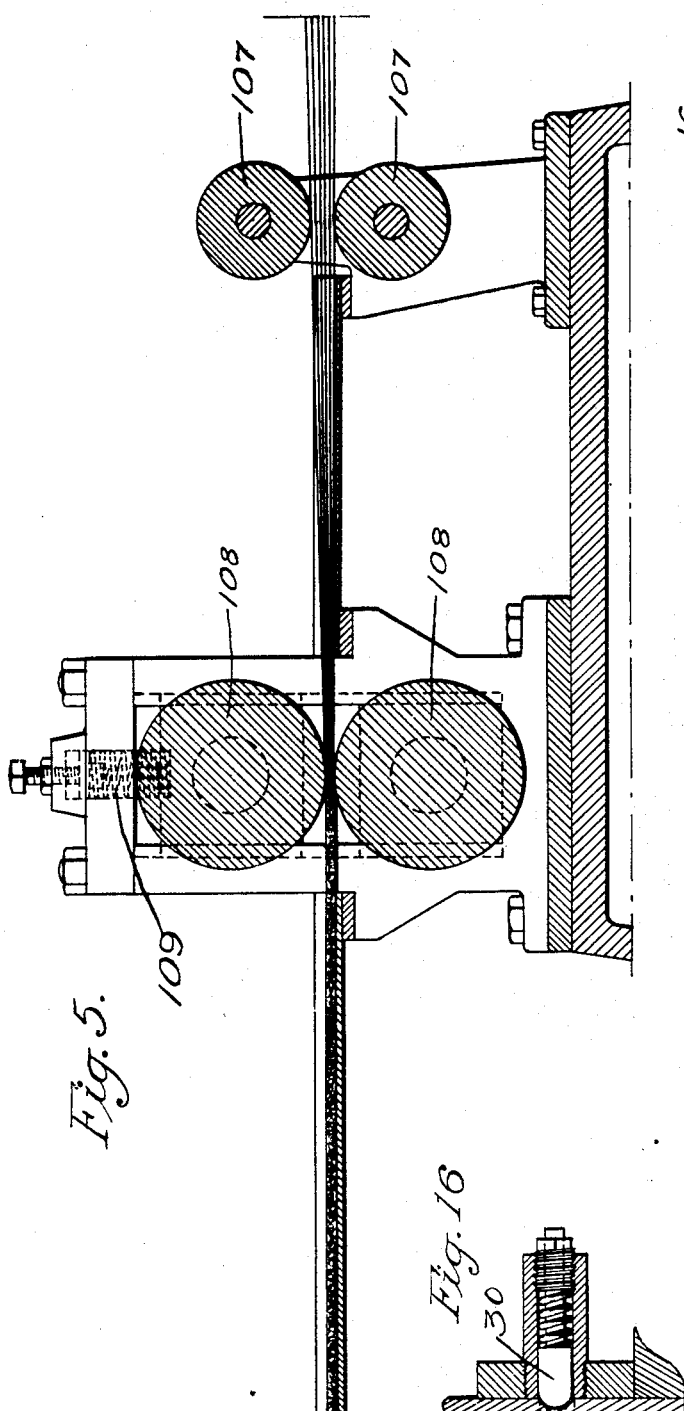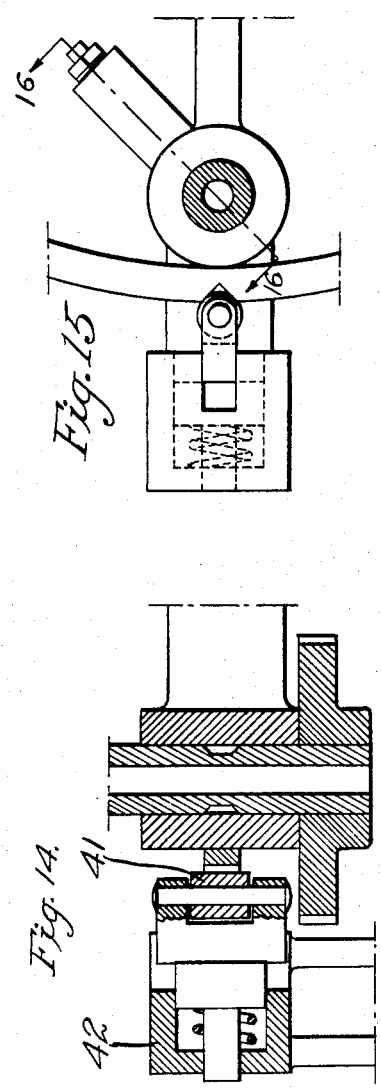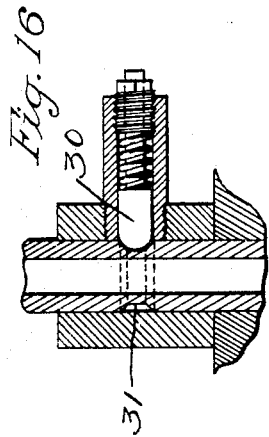

Jan. 30, 1934.　　　　F. H. BENGE　　　　1,945,413
APPARATUS FOR PRODUCING SEGMENTAL RIMS
Filed March 25, 1930　　　12 Sheets-Sheet 6
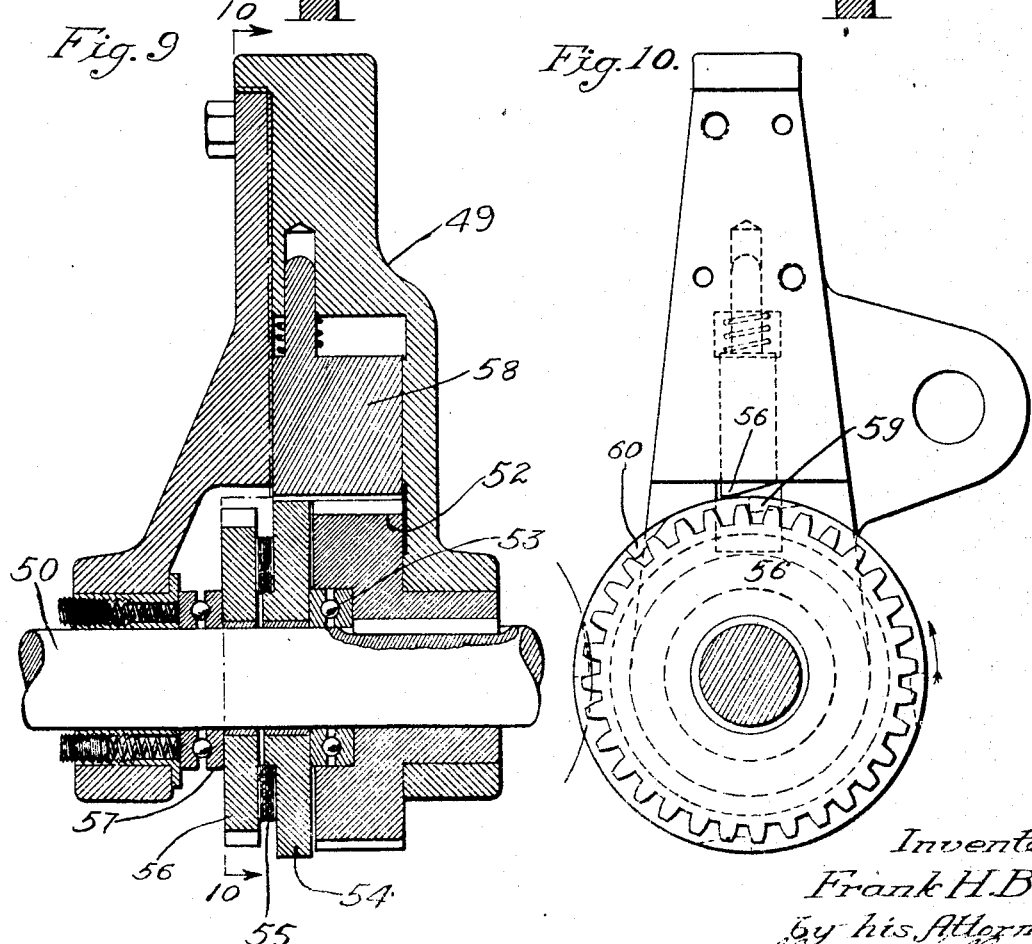

Jan. 30, 1934.  F. H. BENGE  1,945,413
APPARATUS FOR PRODUCING SEGMENTAL RIMS
Filed March 25, 1930  12 Sheets-Sheet 7
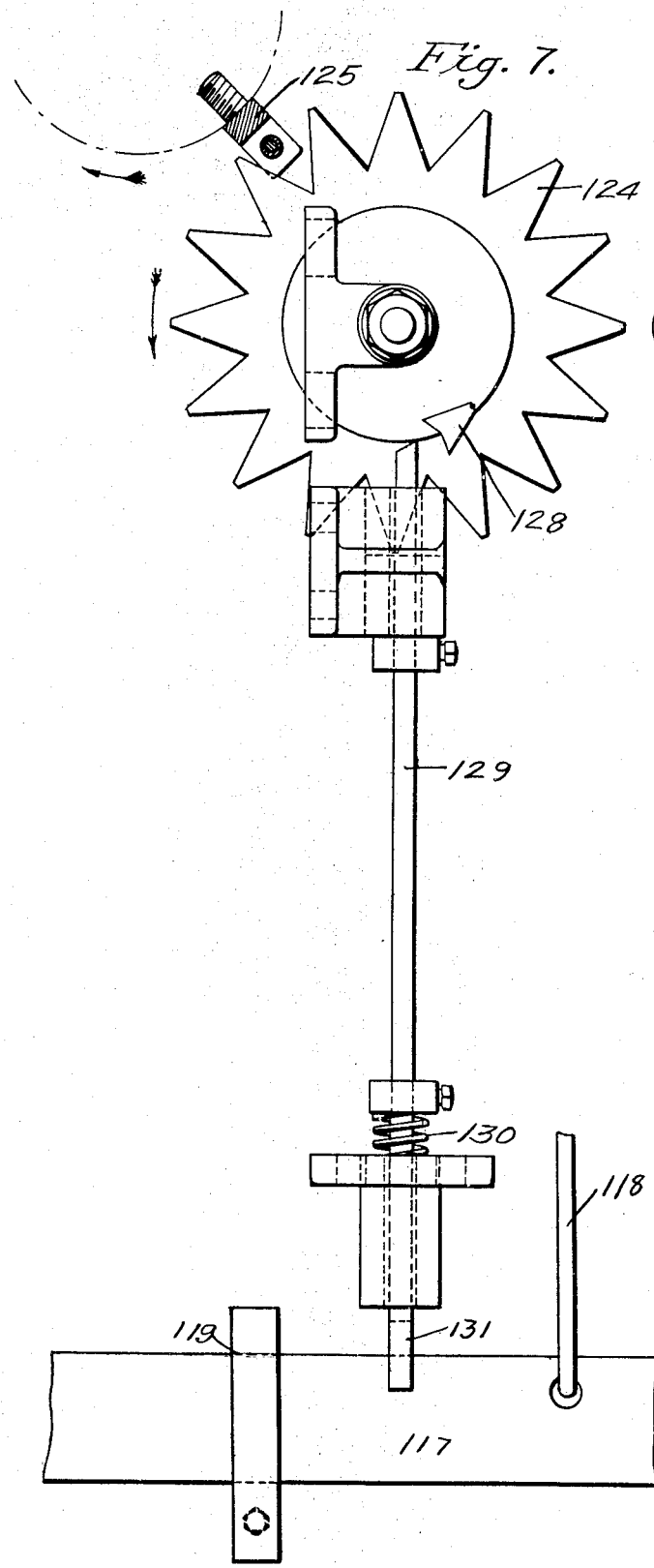
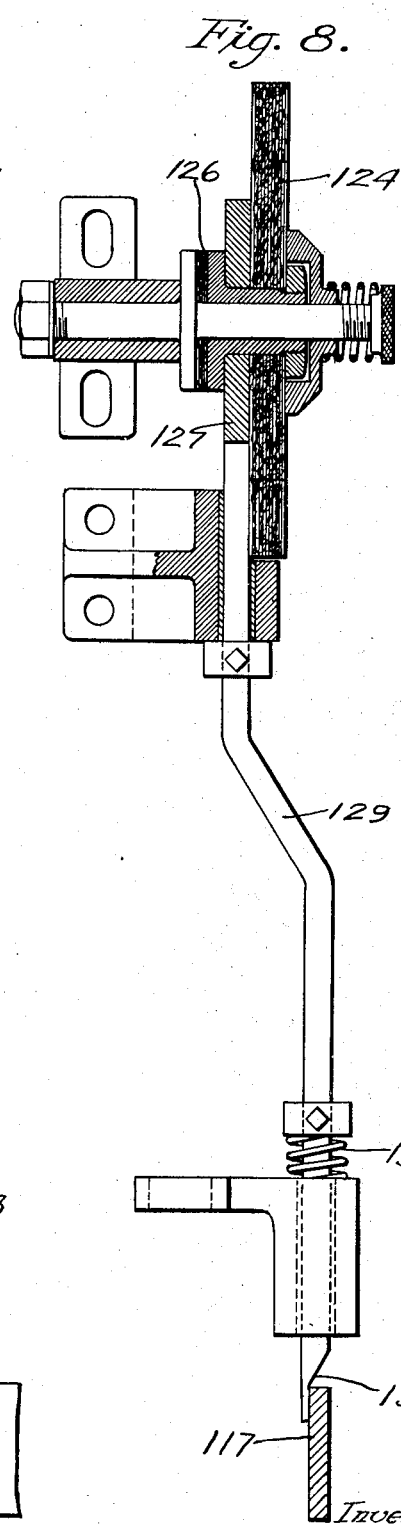
Inventor.
Frank H. Benge
by his Attorneys
Howson & Howson Jan. 30, 1934.     F. H. BENGE     1,945,413
APPARATUS FOR PRODUCING SEGMENTAL RIMS
Filed March 25, 1930     12 Sheets-Sheet 9

Inventor:—
Frank H. Benge
by his Attorneys

Jan. 30, 1934.  F. H. BENGE  1,945,413
APPARATUS FOR PRODUCING SEGMENTAL RIMS
Filed March 25, 1930  12 Sheets-Sheet 10
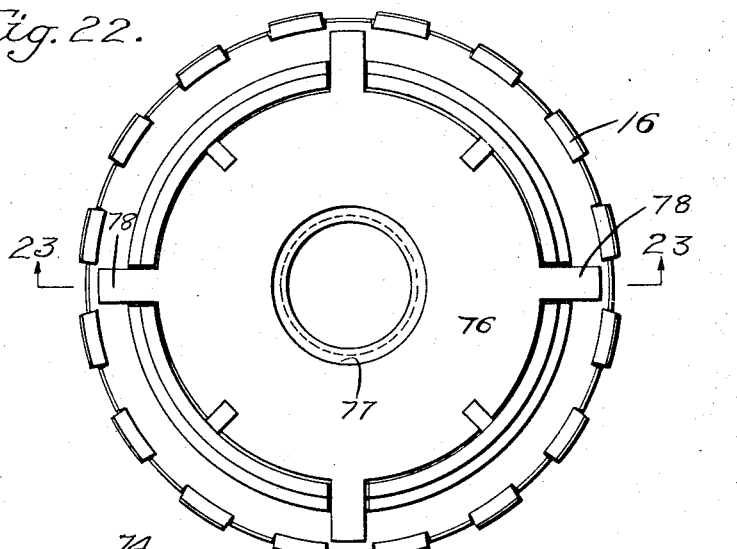
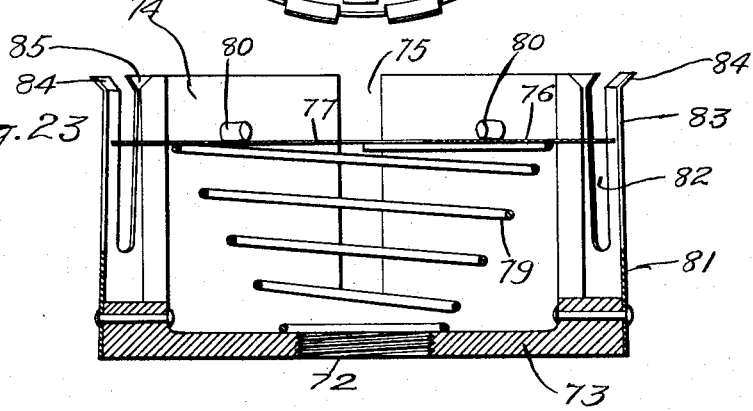
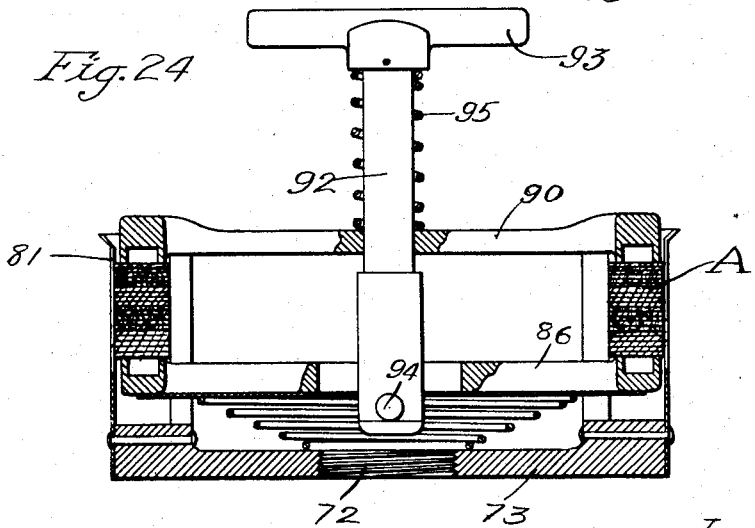
Inventor:-
Frank H. Benge
by his Attorneys
Howson & Howson Jan. 30, 1934.  F. H. BENGE  1,945,413
APPARATUS FOR PRODUCING SEGMENTAL RIMS
Filed March 25, 1930   12 Sheets-Sheet 11

Inventor:—
Frank H. Benge
by his Attorneys
Howson & Howson

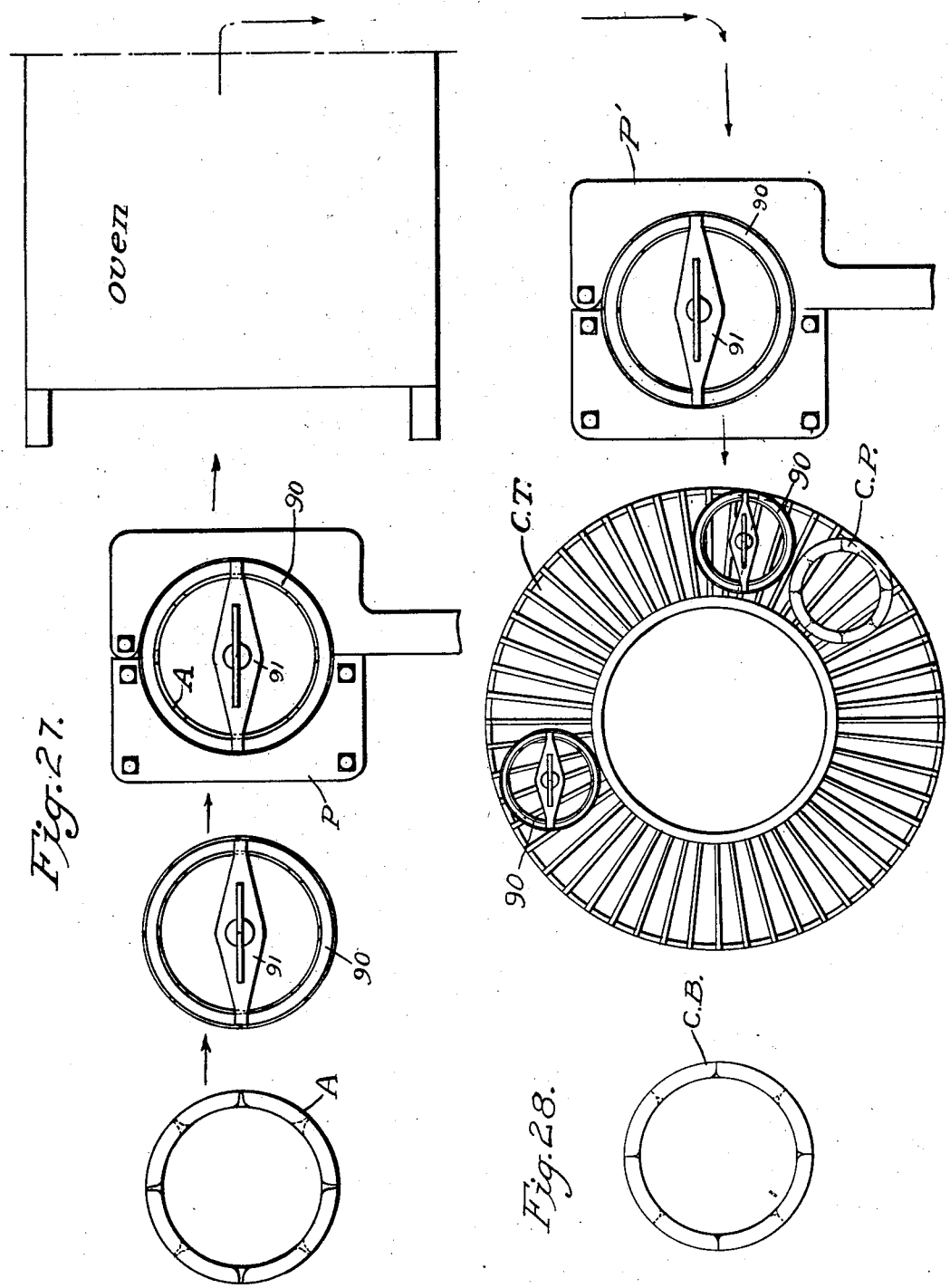

Patented Jan. 30, 1934

1,945,413

UNITED STATES PATENT OFFICE 1,945,413

APPARATUS FOR PRODUCING SEGMENTAL RIMS

Frank H. Benge, Bridgeport, Pa., assignor to Continental-Diamond Fibre Company, Newark, Del., a corporation of Delaware Application March 25, 1930. Serial No. 438,879

56 Claims. (Cl. 154—1)

This invention relates to an apparatus for producing bonded, laminated annuli.

An important object of the invention is the provision of a method producing such annuli particularly adapted for assembling the segments of the rims of so called fibre gears which are usually constructed from layers of impregnated fabric, in which the impregnating material employed is of such character that when heated it becomes adhesive. Heretofore such assemblies have been prepared by hand, and due to the looseness of the assembly, portions of the fabric are left free or disturbed by the cutting apparatus employed in producing the various segments from which the rim is built up, with the result that strings and roughnesses appear at the periphery of the formed annulus.

By the method hereinafter set forth, these roughnesses are eliminated and a rim produced which is rigid and, accordingly, easily handled as compared with the ordinary tied bundle of segments produced by hand.

A further important object of the invention is to produce an apparatus automatically effecting the assembly ordinarily carried out by hand, that of assembling a plurality of segmentally-shaped laminæ in the form of a ring in which ring the laminæ are arranged in layers and the joints of the several layers are staggered with relation to one another.

A further and more specific object of the invention is to produce a machine capable of consecutively punching and assembling such blanks in a continuous operation.

A further object of the invention is the production of an apparatus of this character so constructed that proper alignment of the various segments constituting the annulus is automatically effected and insured, and the segments are held in their assembled relation in such fashion that they are readily engageable by a clamp in which they may be held while being removed from the machine and passed through a cementing process such as set forth in my copending application Serial No. 353,794, filed April 9, 1929, of which application this application is a continuation in part.

A still further and more specific object of the invention is the production of a novel and improved index table bearing a plurality of rotatable holders to receive and hold the segments in their assembled form together with means for indexing rotation of the holders.

These and other objects I attain by the construction shown in the accompanying drawings wherein, for the purpose of illustration, I have shown a preferred embodiment of my invention and wherein:

Fig. 3 is a section on line 3—3 of Fig. 1;

Fig. 4 is an enlarged longitudinal sectional view through the index table, taken on line 4—4 of Fig. 2;

Fig. 5 is a section on line 5—5 of Fig. 2;

Fig. 6 is a section on line 6—6 of Fig. 2;

Fig. 7 is a side elevation of a safety device employed to prevent over-filling any of the blank holders;

Fig. 8 is a vertical sectional view therethrough;

Fig. 9 is a section on line 9—9 of Fig. 2 illustrating the indexing mechanism for the table;

Fig. 10 is a side elevation of the indexing mechanism;

Fig. 11 is a perspective of the die plate;

Fig. 12 is a bottom plan view of the die;

Fig. 12a is a fragmentary bottom plan view of a modified form of die;

Fig. 13 is a section on line 13—13 of Fig. 12;

Fig. 14 is a section on line 14—14 of Fig. 2;

Fig. 15 is a horizontal sectional view through one of the holder spindles;

Fig. 16 is a section on line 16—16 of Fig. 15;

Fig. 22 is a plan view of the blank holder;

Fig. 23 is a section on line 23—23 of Fig. 22;

Fig. 24 is a view similar to that of Fig. 23 with the clamp in position.

Fig. 27 is a diagrammatic view illustrating the steps in completing the rim after its removal from the assembling machine;

Fig. 28 is a plan view of the completed rim.

Figure 1:
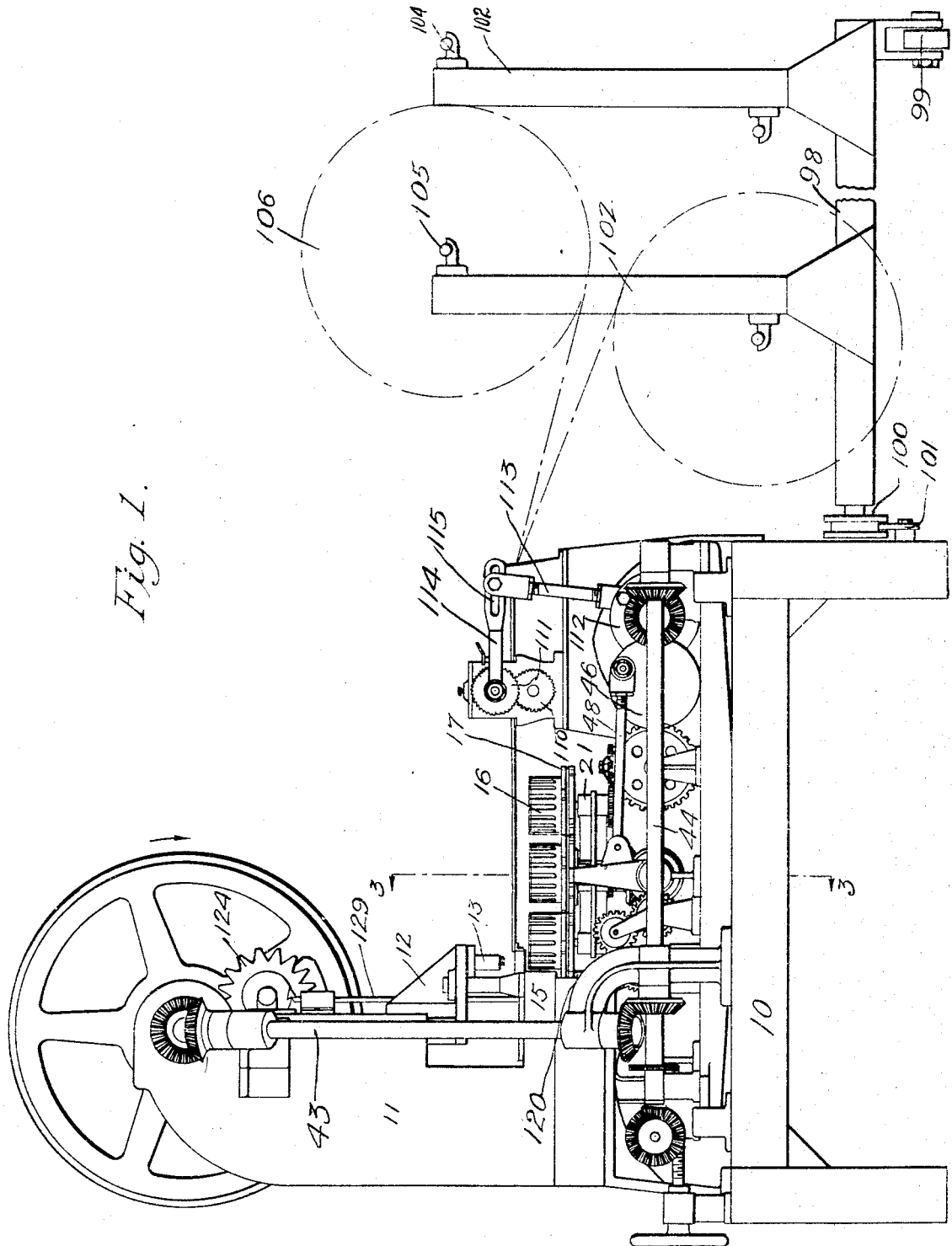
Fig. 1 is a side elevation of a blank assembling machine constructed in accordance with my invention.
Figure 2:
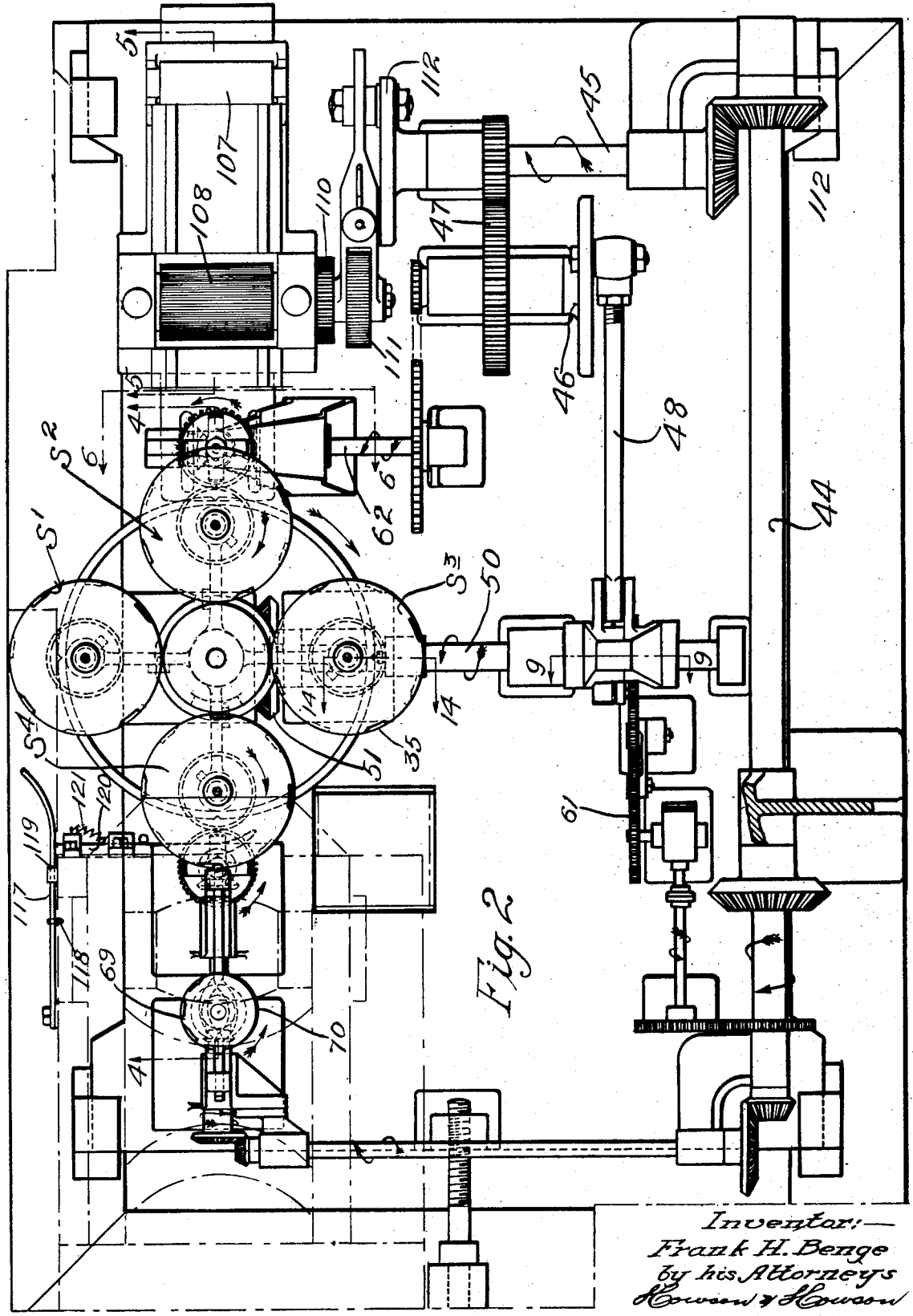
Fig. 2 is a plan view thereof.

Referring now more particularly to the drawings, the machine includes a suitable base 10, on one end of which is mounted a segment-forming and delivering apparatus at present disclosed as a punch press 11, of which the reciprocating die 110 head is indicated at 12, the die at 13, the die plate at 14, and the anvil of the press at 15. The die 13 and die plate 14 are bolted, or otherwise detachably secured to the head and anvil, so that they may be readily exchanged for the production of various sized segments. The die plate 14 bridges an opening in the anvil beneath which holders 16 carried by a rotatable index table 17 may be consecutively positioned.

The index table 17 comprises a central standard 18 arising from the base 10 and rotatably receiving a stationary shaft 19. About this shaft is positioned the hub 20 of a spider, the rim of which is designated at 21. Keyed to the hub is a gear 22 driven as hereinafter described. The lower end of the hub rests upon a suitable wear plate 23, and abutting the upper end of this hub is a pad of friction material 24. This pad has seated thereon a cam disk 25 which is splined to the shaft at 26 and urged downwardly by means of a spring 27.

At uniformly circumferentially spaced points the spider rim mounts vertically-extending rotatable spindles 28 which are hollow and have extending therethrough ejector rods 29 which are preferably headed at both their upper and lower ends, as indicated. Spindles 28 are yieldably held against vertical displacement in the spider by spring pressed plungers 30 which engage in annular grooves 31 formed in the spindles, and have inclined walls which, upon the application of a severe strain to the spindle in the direction of its axis, will act upon the rounded nose of the spring pressed pin to retract the same so that the spindle may shift downwardly without damage.

The lower end of the spindle has secured thereto a gear 32 while the upper end thereof has secured thereto a disk-like head 33 the periphery of which is provided with a flange having a plurality of vertically-spaced notch series, two being illustrated in the present instance, indicated at 34 and 34a respectively, and the notches of each series are staggered with relation to the notches of the associated series. Each series is shown as having four equally spaced notches 35 and the notches of the series 34a are spaced through 45 degrees from the corresponding notches of the series 34.

The under surface of each head flange has a series of four uniformly spaced notches 36 for co-action with an associated spring pressed pawl 37 carried by the arm 38 of the spider. Each pawl 37 has an arm 39 extending beneath the cam disk 25 and adapted to co-act with the peak of the cam indicated at 40 when the table reaches one of its stations and be withdrawn from a notch 36 in which it is engaged so that the head 33 is free to rotate. The spider rim is notched at intervals corresponding in spacing and number to the heads 33, these notches being successively engaged by a spring pressed roller 41 carried by a suitable standard 42 when the table arrives at any one of its stations $S^1$, $S^2$, $S^3$, or $S^4$.

The drive for the table mechanism and for other mechanisms associated with the punch press is taken from the punch press through a drive shaft 43 geared to drive a horizontal shaft 44 mounted in suitable bearings upon the bed. From shaft 44 is driven a shaft 45 at right angles thereto, this shaft being directly geared to a pitman shaft 46 at 47. The pitman shaft at one end has a pitman connected through a link 48 with a yoke 49 rotatably mounted about a shaft 50, one end of which has a gear 51 meshing with the gear 22 of the index table hub. To this shaft is secured a ratchet gear 52 which the yoke straddles and upon the hub of which one arm of the yoke is rotatably mounted. Between a thrust bearing 53 seated against the inner face of this gear and the other arm of the yoke are mounted respectively a control disk 54, a plate of friction material and a gear 56, and a spring pressed thrust bearing 57 urging the gear 56 against the pad of friction material and the control disk 54 against the ratchet gear 52.

Mounted between the arms of the yoke and spring-urged toward the ratchet gear 52 and its control disk 54 is a pawl 58 which is normally held out of engagement with the notches 59 of the ratchet gear by reason of the fact that the control disk maintains it in a retracted position. The notches of the gear preferably correspond in number to the stations of the index table, while the control disk has preferably but a single notch 60. Gear 56 is driven from shaft 44 through reduction gearing 61, at any desired speed and through friction material 55 drives the control disk 54. When the notch 60 of the control disk comes in alignment with the pawl 58 the pawl may drop so that it will enter the notch 59 of the ratchet gear and during oscillation of the yoke advance shaft 50 thereby causing rotation of the index table to its next station when it will be held in position by the spring pressed roller 41. Tendency to overthrow of the table is eliminated through the friction applied by friction plate 24 against the hub of the table. During shifting of the gear 52 by the yoke and pawl control disk 54 moves independently of gear 56 and assumes a new position with relation thereto. Upon the speed of gear 56 depends the length of time through which the table remains in any one of its stations.

At station $S^1$, formed blanks are removed from the holders 16 and fresh clamp bases are inserted in these holders. At station $S^2$ the heads 17 are properly positioned for correlation with the head indexing mechanism to be described, so that any rotation of the head which may have taken place during removal of the blank and insertion of the clamp by the operator may be corrected. This mechanism comprises a continuously driven gear 62 which meshes with the gear 32 of a given table when this table occupies station $S^2$. The drive of gear 62 which is indirectly taken from shaft 44 includes a pair of friction plates 63 held in engagement with the gear through the spring 64 and which constitutes the sole connection between this gear and the final drive shaft 65 therefor. If, when a given head 33 arrives at station $S^2$, pawl 37 is not engaged in a notch 36 thereof, the gear 62 will drive the gear 32, rotating the spindle 28 and the table until a notch is engaged by the pawl. If on the contrary, the pawl is engaged in a notch, then the gear 62, when it comes in mesh with gear 32, merely checks its rotation and slips between the plates 63.

Station $S^3$ is an idle station at which no operations take place, the pawl 37 holding the heads during their movement from station $S^2$ through station $S^3$ to station $S^4$ at which time the arm of the pawl comes into engagement with the peak of the cam and the head is free for rotation. Station $S^4$ is the filling and indexing station for the heads 33 and as the heads come into this position the gears 32 thereof engage with a continuously driven gear 66 mounted similarly to the gear 62 and driven from shaft 44 and the notch series 34, 34a thereof come into alignment with a pair of latches 67, 67ª controlled by cams 68, 68ª. Cams 68, 68ª have each a series of lobes 69 corresponding in number to the number of notches of the series, and a long dwell 70, the dwell of one cam corresponding to the lobe series of the other. Either the dwell or the lobe 69 of either of these cams when coming into engagement with the associated latch 67, 67ª through lugs 71 formed thereon will withdraw the latch from the notch in the table flange so that the table flange may be rotated. One of the lobes may coincide with and form the end of the dwell if so desired.

Cams 68ª are continuously driven through the same take-off employed for driving gear 66 and it will, accordingly, be noted that when a head arrives at station S⁴ there is a constant tendency to drive the same by gear 66. This tendency is, however, resisted through engagement of one of the latches 67, or 67ª in a notch 35 of a notch series 34 or 34ª. The periodical withdrawal of the latch which is engaged with a notch series will permit gear 66 to rotate the head until the latch which is spring pressed is again engaged in a notch. Since there are four notches illustrated in the present instance, the head will be rotated through a quarter turn, then arrested, then released and again rotated until it has completed one rotation. At this time the dwell of the cam controlling the latch which has been in engagement completely withdraws the latch and at the same time the other of the latches comes into operative engagement with its notch series. This notch series being staggered with relation to the first-named notch series, the first rotation of the head will be only through one-eighth of a revolution and the head will subsequently make three further steps spaced through one-quarter of a revolution each. This series of steps completed, the first-mentioned latch returns into operative position, and so on, for the number of operations possible during the time that the table is in position at the station.

It will thus be obvious that if a quarter segmental structure is superimposed upon the head at a given point at given intervals properly timed with relation to the stationary moments of the head there will be four segments placed in a series about the table, after which the head will shift with relation to the first-named segments so that a second series of segments laid upon the first series will be staggered with relation thereto through 45 degrees, thus breaking the joints between the segments.

Each table has an axially threaded boss 72 adapted to thread into the bottom 73 of the assembly holder 16. Arising from the bottom 73 of the assembly holder at a point spaced inwardly from the perimeter thereof is a rigid wall 74 which is slotted at diametrically-opposed points, as indicated at 75, with vertically-extending slots which open through the upper ends thereof. Within this wall is disposed a plate 76 having a central opening 77 and having wings 78 projecting through the slots. A light spring 79 constantly urges this plate upwardly and pins 80 limit the upward movement of the plate at a point adjacent the upper end of the wall 74. Projecting upwardly from the perimeter is an annular wall 81 formed of some suitable spring material such as brass and having its upper portion vertically slotted as at 82 to produce spring fingers 83, the upper ends of which have outwardly turned portions 84. The spring fingers 83 at their upper ends are spaced from the rigid wall a distance less than the radial width of the segments which are to be assembled in the holder. The upper end of the rigid wall 74 at its outer face is beveled as at 85 so that the inner and outer walls combine to produce a flaring mouth in which the segments to be assembled may be introduced.

In combination with the holders I provide clamps, each comprising a base portion in the form of an annular ring 86 having a transversely-extending strut 87 which, at its axis, is provided with an opening 88 having diametrically-opposed coves 89. The clamp further comprises a similar ring 90, the strut 91 of which has slidably and rotatably directed therethrough at its axis the stem 92 of a clamp rod which has a head 93 at one end and has a cross pin 94 directed therethrough at the opposite end. A spring 95 extends between the cross bar 91 and the head 93.

In assembling the elements of the clamp upon a formed annulus A and assuming the bottom ring 86 to be in position beneath the same, the upper ring 90 is superimposed upon the annulus, the clamping rod being positioned to enter the pin 94 through the coves 89 of strut 87 of the bottom ring. The clamping rod is forced through the bottom ring against the action of the spring, rotated through 90 degrees to displace the pin 94 from the coves, when the clamping rod may be employed as a handle for handling both the clamp and the held rim, spring 95 acting to hold the rings together upon the rim.

In use of the clamp with the holder above described the bottom section of the clamp is inserted into the holder at station S¹, the ends of the strut 87 extending through diametrically-opposed slots 75. This bottom section then passes through stations S² and S³ to station S⁴ where the segmental rim-forming elements RS are placed in the holder. The elements as placed in the holder will force the spring fingers 83 outwardly and will be gripped by these spring fingers with sufficient resistance to overcome the tendency of spring 79 to force them out of the space therebetween. As the successive layers are inserted, the plate 76 and the lower clamping ring are forced downwardly until they finally assume a position similar to that of Fig. 24, at which time the assembly is complete. At this time the holder moves from station S⁴ to station S¹ where the operator assembles a clamp upon the segment in the manner hereinbefore described, after which the segment is withdrawn from the holder and while still in position in the clamp passes through the cementing process described in the copending application above identified. Removal of the clamp from the holder is effected by means of a vertically-reciprocable rod 96 controlled by a foot treadle 97 with which the plunger 29 of the head aligns when the head is at station S¹. The rod 96 shifted upwardly by depression of the treadle, engages a plunger 29 forcing the same upwardly so that the upper end thereof contacts the lower end of the clamp rod 92 thereby bodily shifting the clamp and the assembly segment upwardly.

Figure 17:
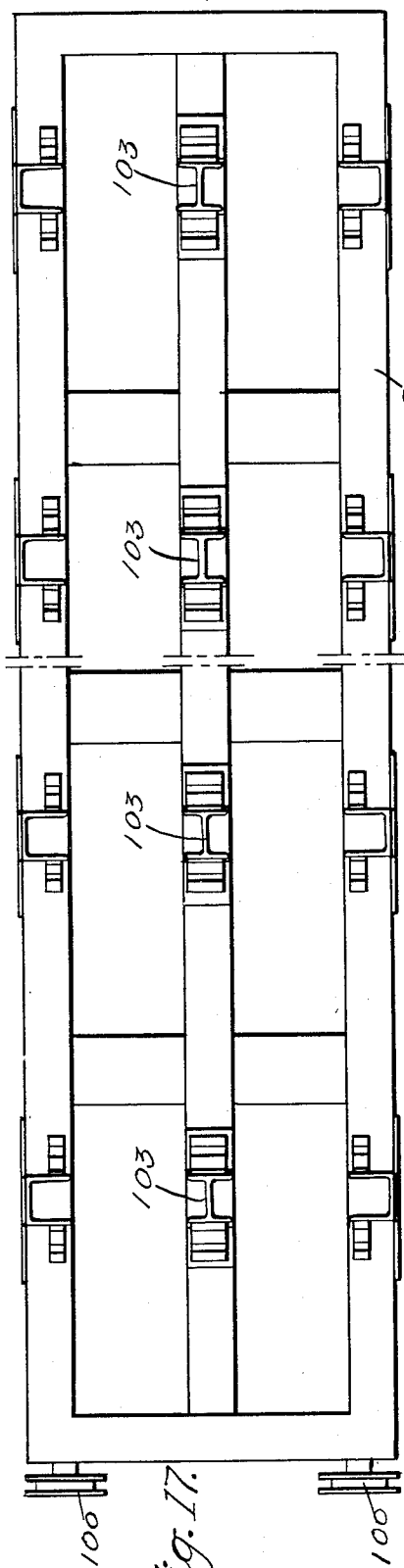
Fig. 17 is a plan view of the roll-holding table.
Figure 18:
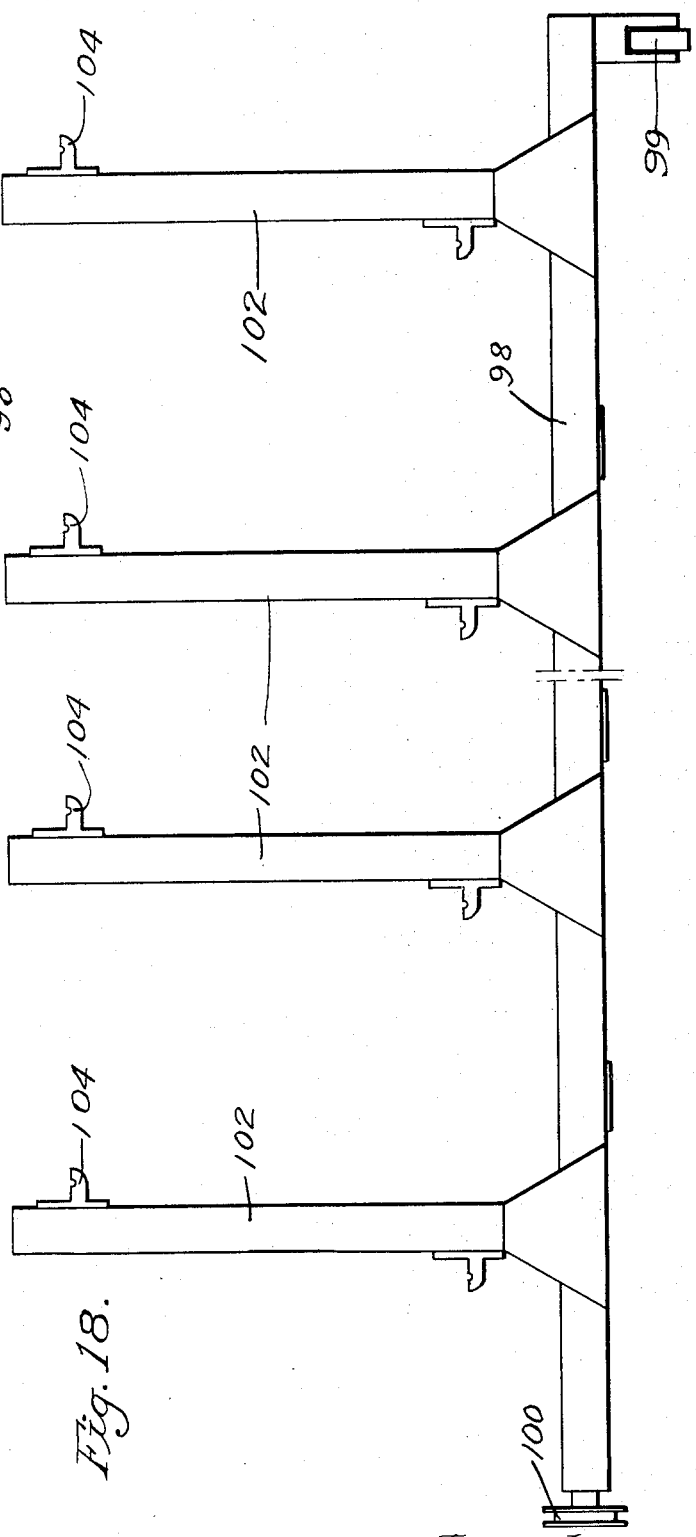
Fig. 18 is a side elevation thereof.
Figure 19:
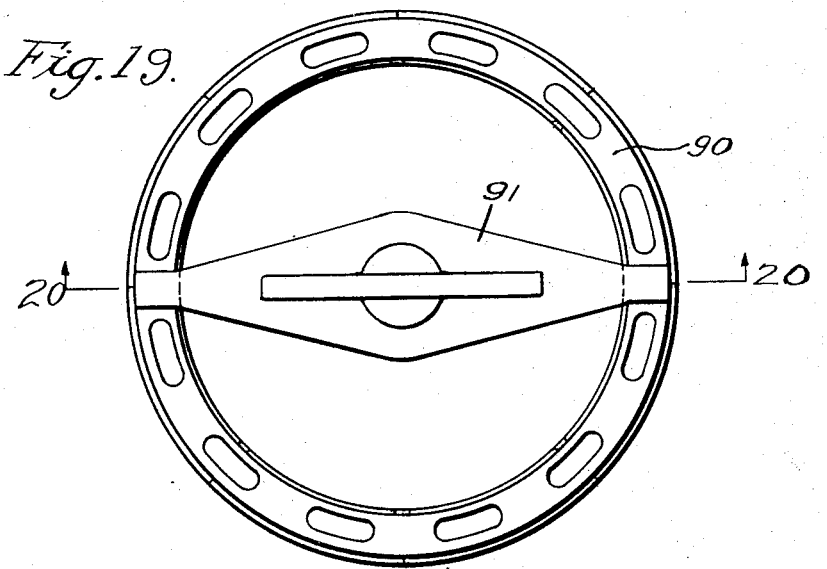
Fig. 19 is a plan of the blank-holding clamp.
Figure 20:
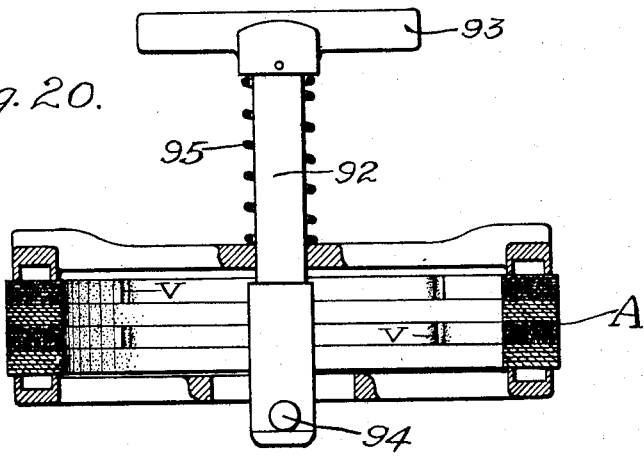
Fig. 20 is a section on line 20—20 of Fig. 19.
Figure 21:
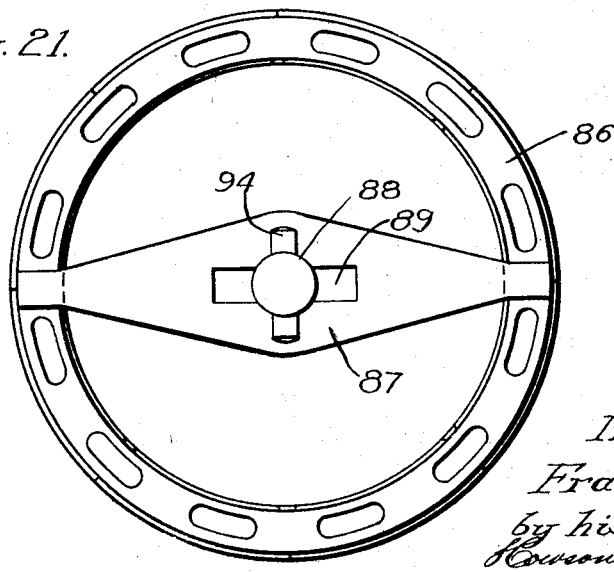
Fig. 21 is a bottom plan view of the clamp.

The material employed in the formation of the segments which are used in the construction of the rim comprises sheets of previously treated material including an adhesive such as celeron. These strips are held upon a convenient table or rack, more clearly shown in Figs. 17 and 18 which rack comprises a frame 98 having at one end supporting wheels 99 adapted to engage the floor and at its opposite ends supporting wheels 100 to engage upon a track 101 carried by an end of the base 10. Arising from the frame 98 are standards 102 and 103 there being a standard 102 at each side of the frame and a standard 103 between each pair of standards 102. These standards have at opposite sides thereof bearings 104 for the reception of roll mounts or spindles 105 upon which the rolls 106 of material are placed. It will be obvious that by having these rolls arranged in two rows the material from the rolls of one row may be employed in the machine and when these rolls become exhausted the frame 98 may be shifted to align the other rows with the feed mechanism hereinafter described so that the resulting check in operation is very short.

The sheets from the rolls are lead through guide rollers 107 and thence between knurled feeding rollers 108, these rollers being spring-urged into contact with the material as at 109. The rollers 108 are gear connected at 110 and one of the rollers has an extension mounting a ratchet 111. Shaft 45 has a pitman 112 connected by a link 113 with a ratchet pawl yoke 114 mounted upon the extension of the knurled roller, the connection between the link and the yoke being adjustable as at 115 so that the extent of feed may be readily adjusted. This ratchet mechanism serves to advance the material at the desired rate to the die and die plate of the punch machine and the knurled rollers being spring pressed tend to engage the material. The die employed has projecting through its lower face plungers 116 which are spring pressed downwardly and which serve, after punching of the material, to yieldably urge the material to its lowered position. These plungers may, however, yield to prevent breakage in event of solid resistance to lowering movements.

Figure 25:
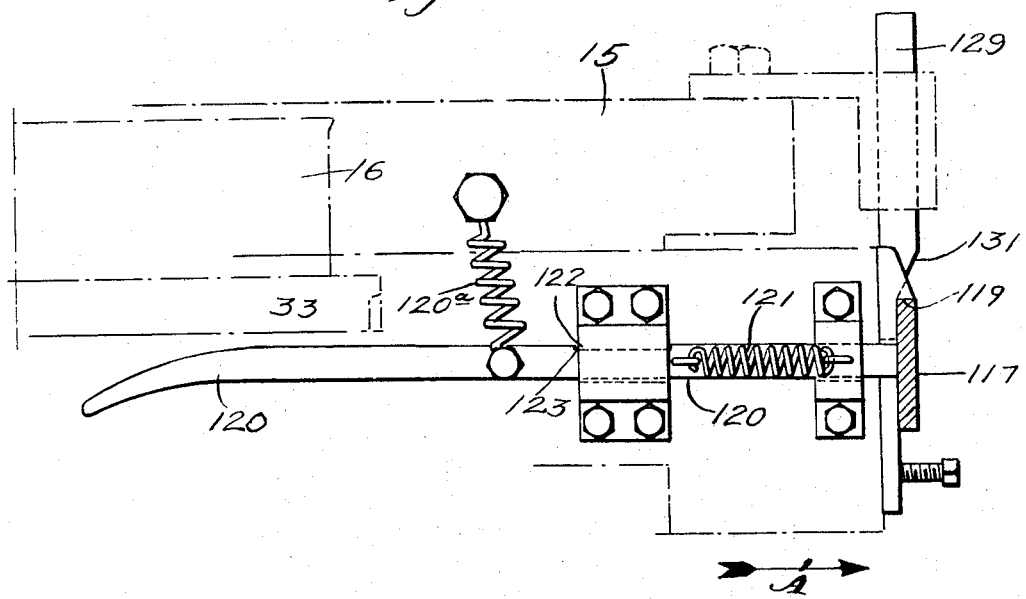
Fig. 25 is a detail view showing the safety mechanisms employed to avoid breakage of the index table and overloading of the holders.

As a further means for preventing breakage in event of failure of the indexing mechanism controlling rotation of the table which would ordinarily cause a severe strain upon the apparatus due to the fact that the continuation of the punching operation would result in too great an amount of material being placed in the holder and a consequent heavy downward pressure thereon, I provide a yieldable head mounting hereinbefore described, and operatively connect the same with a clutch lever 117 controlling the usual clutch of the stamp press (not shown). Such clutch levers are usually spring urged to an inoperative position by a spring indicated at 118 and are held in their lowered position by means of a lug 119 or other stop beneath which the lever may be placed, the lever being capable of a slight oscillation in the general direction of the arrow of Fig. 25. In proximity to the inner face of this clutch lever, I extend one end of a bolt 120, the opposite end of which is arranged adjacent the die plate and in a position such that upon lowering of a head 33, the head will engage therewith. This bolt is urged longitudinally by a spring 121 but is withheld from longitudinal movement by a lug 122 carried by the punch press frame, or any other convenient stationary part, and engaging in a notch 123 formed therein, the engagement being maintained through a spring 120ª. If a table be depressed through an unusual strain placed thereon, as for example by too much material being deposited in a holder carried by the table, then the inner end of the bolt 120 will be depressed freeing the same from lug 122 so that spring 121 will urge the same longitudinally forcing the lever 117 in the direction of the arrow A to thereby release it from its lug 119 so that it may be moved upwardly by its spring to its clutch-disconnecting position. The bolt 120 will, of course, operate to disconnect the clutch upon any emergency causing a depression of the table. As a means for insuring against deposit of more than a predetermined number of segments by the punch press in a given holder, I provide a further safety device more clearly shown in Figs. 1, 7 and 8. This apparatus comprises a star wheel 124 positioned adjacent a rotating part of the punch press and operated by a trip element 125 carried by such rotating part. Rotation of the star wheel is frictionally resisted as at 126 to prevent overthrow thereof and this wheel is provided with a hub 127 having a throw-out cam 128 operating against a longitudinally shiftable bolt 129 normally held in engagement with the periphery of the hub through a spring 130. The lower end of this bolt extends behind the clutch lever 117 so that when this bolt is forced downwardly by the cam 128 the tapered lower end 131 thereof wedges the lever outwardly to disengage the same from the lug 119.

From the foregoing it will be obvious that the table or spider 21 partakes of index rotation successively bringing the holders 16 into position beneath the punching mechanism. The material is fed beneath the punch which is continuously operating and as a holder is beneath the die plate and is receiving cut material passed therethrough by the die it, itself, partakes of an index rotation resulting in assembling of the segments in layers in which the segments of each layer are broken jointly with relation to the segments of the preceding layer. While I have in the present instance disclosed the joints as broken through 45 degrees and the segments as quarter-segmental, it will at once be obvious that any desired number of segments can be employed and the extent through which the joints is broken is entirely a matter of selection. With the assembly of the desired number of segmental layers, the indexing means of the table operates to deliver the completed rim to the station $S^1$, where the assembly of the clamp on the rim is completed and the rim ejected. The details of the various operations hereinbefore set forth have been completely described in connection with the description of construction of the several parts.

Figure 26:
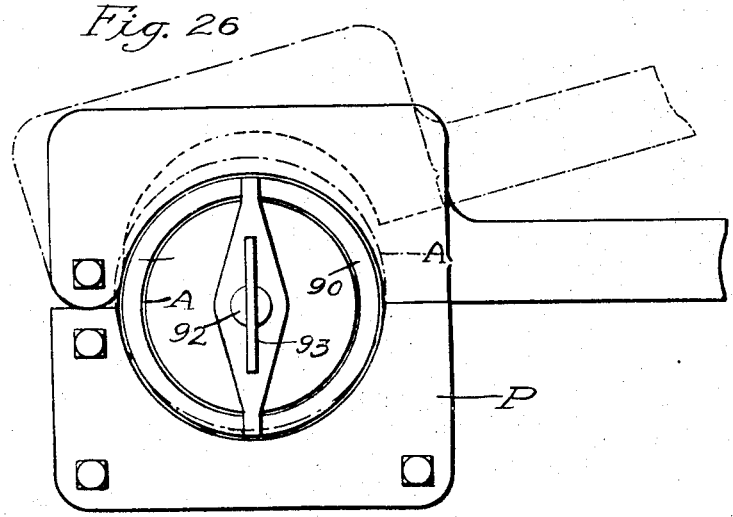
Fig. 26 is a plan view of a press or constricting mechanism, the dotted lines indicating the position of the movable jaw of the press and of the rim before its contraction.

In constructing and assembling the segments, care should be taken that the inner wall maintain the segments in such position that their inner ends are spaced from one another so that when the clamp is removed the appearance of the assembled rim is as in Fig. 27. The rim, while still in position in the clamp, is then placed in a constricting mechanism P such as illustrated in Fig. 26, and pressure applied thereto so that the rim in its final assembly and before its passage through the cementing process is brought to its proper size and the ends of the segments shifted into engagement with one another as more clearly shown in Fig. 28. Spacing of the ends of the segments with the ends of the assembly insures against cocking of any of the segments and the consequent possible stoppage of the machine through the safety devices hereinbefore described or production of an imperfect blank.

It will be noted that in use of the apparatus hereinbefore set forth the method of producing the rim is substantially as follows:

A plurality of sheets of fabric impregnated with a heat-responsive bonding agent such as, for example, a synthetic resin, are first superimposed to provide a strip of the desired thickness, which strip is then cut by a punch to form segments. The segments thus produced are assembled initially upon a diameter greater than that which they will finally occupy, sufficient space thus being left between the ends of the segments to insure against any possible voids in the completed structure resulting from connecting or overlapping of segments of the same layer of the rim so that it is possible to use much thicker segments than would ordinarily be possible. After reduction of diameter of the rim to its intended size by constricting mechanism P, the rim is passed through a heating oven O in which the bonding material of the several segments and of the elements of the several segments becomes adhesive and interconnects the segments. Upon removal from the heating oven, the blank is first placed through a second constricting mechanism forming press which acts upon the periphery thereof to force any projecting threads or portions of the rim which may have become deformed in passage through the heating oven, back into their proper positions, this press being generally indicated at P¹, and being identical in structure with the constricting mechanism of Fig. 26. After restoration of the blank to its proper external form and diameter by the mechanism P¹, the rim still held between the clamp is placed upon a cooling table CT where it is subjected to a blast of air from a suitable source, and thereby caused to set in its proper form. The completed blank CB is rigid and can be conveniently handled as it is possible to throw the blanks into receiving baskets or trays by means of which they may be transported from place to place.

No claim is made to the above method in this application, such method being covered in my copending application filed May 31, 1932, Serial No. 614,650 for Method of producing segmental rims, which is in part a division of this application.

Such a blank differs materially from the ordinary rim blank as set up by hand which, if handled roughly, will become deformed and the segments thereof disarranged so that it is extremely difficult to manipulate in placing in the mold.

In constructing the die 13, the edges of the segmental cutting portion 13ª are preferably formed to converge upon an angle greater than the angle subtending the segment, as clearly illustrated by the construction lines applied to Fig. 12, wherein C designates the center of curvature of the die faces and R the radii defining the subtended angle of the outer face of the die.

By employing either construction the segments when in assembled relation have the outer edges of their end faces in contact but the inner edges somewhat spaced so that a void V is formed in the completed blank in which the material forming the body B of the gear may interlock to increase the strength of the union between the rim and body. Somewhat the same result may be obtained by dubbing the inner corners of the end edges of the cutting portion as suggested at 73ᵇ in Fig. 12ª.

Since the construction hereinbefore set forth is obviously capable of a certain range of change and modification without in any manner departing from the spirit of my invention, I do not wish to be understood as limiting myself thereto except as hereinafter claimed.

I claim:

1. In a segment-assembling machine, a multi-station indexed carrier, rim holders carried thereby, means for delivering segments to the holders at one station of the carrier and means providing indexed rotation of the holders at said station.

2. In a segment-assembling machine, a multi-station indexed carrier, rim holders carried thereby, means for delivering segments to the holders at one station of the carrier, means providing indexed rotation of the holders at said station, and means at a previous station for preliminarily indexing the holder for co-action with the last-named means.

3. In a segmental body assembling machine, a holder to receive and hold the segments, a clamp element removably disposed in the holder and adapted to underlie segments placed therein, and a second clamp element detachably engageable with the first-named clamp element and adapted to engage the upper surface of the segmental assembly and combining with the first-named clamp element to maintain the assembly in the assembled relation during removal and when removed from the holder.

4. In a segmental body assembling machine, a holder to receive and hold the segments, a clamp element removably disposed in the holder and adapted to underlie segments placed therein, and a second clamp element detachably and yieldably engageable with the first-named clamp element and adapted to engage the upper surface of the segmental assembly and combining with the first-named clamp element to maintain the assembly in the assembled relation during removal and when removed from the holder.

5. In a segmental rim-assembling machine for assembling rims comprising layers of relatively thick segments, a holder providing an annular channel to receive and hold the segments, said channel having a circumferential length greater than the combined length of the segments composing a layer of the rim, means for depositing segments in said channel in layers with adjacent ends of the segments of each layer in spaced non-lapping relation, a clamp element removably disposed within the channel of the holder and adapted to underlie the segments placed therein and a second clamp element adapted to detachably engage the first-named clamping element and adapted to engage the upper surface of the rim, said clamp elements combining to maintain the segment assembly in assembled relation during removal and when removed from the holder.

6. In a segmental rim-assembling machine for assembling rims comprising layers of relatively thick segments, a holder providing an annular channel to receive and hold the segments, said channel having a circumferential length greater than the combined length of the segments composing a layer of the rim, means for depositing segments in said channel in layers with adjacent ends of the segments of each layer in spaced non-lapping relation, a clamp element disposed within the channel of the holder and adapted to underlie the segments placed therein, a second clamp element adapted to detachably engage the first-named clamping element and adapted to engage the upper surface of the rim, and means for yieldably urging the clamping elements toward one another, said clamp elements combining to maintain the segment assembly in assembled relation during removal and when removed from the holder.

7. In a segmental rim-assembling machine, a rotatable head, annular flanges extending upwardly from said head and combining to produce an annular channel, the outer flange comprising a plurality of resilient fingers normally spaced from the inner flange a distance less than the radial depth of the segments to be assembled.

8. In a segmental rim-assembling machine, a rotatable head, annular flanges extending upwardly from said head and combining to produce an annular channel, the outer flange comprising a plurality of resilient fingers normally spaced from the inner flange a distance less than the radial depth of the segments to be assembled, the upper ends of the inner and outer walls combining to provide a flaring mouth for the channel.

9. In a segmental rim-assembling machine, a rotatable head, annular flanges extending upwardly from said head and combining to produce an annular channel, the outer flange comprising a plurality of resilient fingers the upper ends of which are normally spaced from the inner flange a distance less than the radial depth of the segments to be assembled, the inner wall being longitudinaly slotted, a plate within the inner wall and having portions projecting through said slots into the channel and a light spring urging said plate in the general direction of the mouth of the channel.

10. In a segmental rim-assembling machine, a rotatable head, annular flanges extending upwardly from said head and combining to produce an annular channel, the outer flange comprising a plurality of resilient fingers the upper ends of which are normally spaced from the inner flange a distance less than the radial depth of the segments to be assembled, the inner wall being longitudinally slotted and a clamp comprising clamping elements each embodying an annular rim to engage in said channel and a strut to extend transversely of the holder and through said slots.

11. In a segmental rim-assembling machine, a rotatable head, annular flanges extending upwardly from said head and combining to produce an annular channel, the outer flange comprising a plurality of resilient fingers the upper ends of which are normally spaced from the inner flange a distance less than the radial depth of the segments to be assembled, the inner wall being longitudinally slotted and a clamp comprising clamping elements each embodying an annular rim to engage in said channel, and a strut to extend transversely of the holder and through said slots, one of said clamping elements including means for connecting the clamping elements and for yieldably urging them toward one another.

12. In a segmental rim-assembling machine, a rotatable head, annular flanges extending upwardly from said head and combining to produce an annular channel, the outer flange comprising a plurality of resilient fingers the upper ends of which are normally spaced from the inner flange a distance less than the radial depth of the segments to be assembled, the inner wall being longitudinally slotted and a clamp comprising clamping elements each embodying an annular rim to engage in said channel, a strut to extend transversely of the holder and through said slots, one of said clamping elements including means for connecting the clamping elements and for yieldably urging them toward one another, and means movable axially of the holder to engage said clamp and eject the clamp from the holder together with an engaged rim.

13. In a segment-assembling machine, a multi-station indexed carrier, rim holders carried thereby, means for delivering segments to the holders at one station of the carrier, means providing indexed rotation of the holders at said station and means initiating operation of the carrier to shift the same and checking operation of the segment delivering means through an index period after delivery of a predetermined number of segments to a holder.

14. In a segment-assembling machine, a multi-station indexed carrier, rim holders carried thereby, means for delivering segments to the holders at one station of the carrier, means providing indexed rotation of the holders at said station, means at a previous station for preliminarily indexing the holder for co-action with the last-named means, and means initiating operation of the carrier to shift the same and checking operation of the segment delivering means through an index period after delivery of a predetermined number of segments to a holder.

15. In a segmental rim-assembling machine, a holder providing an annular channel to receive and hold the segments, said channel having a circumferential length greater than the combined length of the segments composing a layer of the rim, a clamp element removably disposed within the channel of the holder and adapted to underlie the segments placed therein, a second clamp element adapted to detachably engage the first-named clamping element and adapted to engage the upper surface of the rim, means for delivering segments to the holder along a fixed path and means indexing rotation of the holder to space the delivered segments about the periphery thereof.

16. In a multi-layer segmental rim-assembling machine, a holder providing an annular channel, means for delivering segments to the channel, and means for imparting a step-by-step rotation to the holder wherein the stationary moments between steps of alternate complete rotations of the holder are staggered.

17. In a multi-layer segmental rim-assembling machine, a holder providing an annular channel, means for delivering segments to the channel, means for imparting a step-by-step rotation to the holder wherein the stationary moments between steps of alternate complete rotations of the holder are staggered, and means for checking operation of the delivery means after delivery of a predetermined number of segments to the holder.

18. In a segment-assembling machine, a multi-station indexed carrier, rim holders carried thereby, means for delivering segments to the holders at one station of the carrier and means providing indexed rotation of the holders at said station, said holders being yieldable under a predetermined pressure acting in the direction of delivery of the segments.

19. In a segment-assembling machine, a multi-station indexed carrier, rim holders carried thereby, means for delivering segments to the holders at one station of the carrier, means providing indexed rotation of the holders at said station, said holders being yieldable under a predetermined pressure acting in the direction of delivery of the segments and means for checking delivery of the segments operated by yielding of the holder.

20. In a segmental body assembling machine, a rotatable holder to receive the segments, means for delivering segments thereto, and means for indexing rotation of the holder to space the segments of the body, said holder being yieldable in the direction of delivery of segments thereto upon application of a predetermined pressure.

21. In a segmental body assembling machine, a rotatable holder to receive the segments, means for delivering segments thereto, means for indexing rotation of the holder to space the segments of the body, said holder being yieldable in the direction of delivery of segments thereto upon application of a predetermined pressure, and means checking delivery of the segments upon yielding of the holder.

22. In a segmental body assembling machine, a rotatable holder to receive the segments, means for delivering segments thereto, means for indexing rotation of the holder to space the segments of the body, said holder being yieldable in the direction of delivery of segments thereto upon application of a predetermined pressure, and means checking delivery of segments to the holder after delivery of a predetermined number of segments thereto.

23. In a segmental body assembling machine, a rotatable holder to receive the segments, means for delivering segments thereto, means for indexing rotation of the holder to space the segments of the body, said holder being yieldable in the direction of delivery of segments thereto upon application of a predetermined pressure, means checking delivery of the segments upon yielding of the holder, and means checking delivery of segments to the holder after delivery of a predetermined number of segments thereto.

24. In a multi-layer segmental rim-assembling machine, rotatable holders, means for moving the holders step-by-step through a series of stations, means for delivering segments to the holders at one of said stations, and means for rotating the holder at said station.

25. In a multi-layer segmental rim-assembling machine, rotatable holders, means for moving the holders step-by-step through a series of stations, means for periodically delivering segments to the holders at one of said stations and means for imparting a step-by-step rotation to the holder at said station.

26. In a multi-layer segmental rim-assembling machine, rotatable holders, means for moving the holders step-by-step through a series of stations, means for periodically delivering segments to the holders at one of said stations and means for imparting a step-by-step rotation to the holder at said station wherein the steps of alternate rotations of the holder are staggered with relation to one another.

27. In a multi-layer segmental rim-assembling machine, rotatable holders, means for moving the holders step-by-step through a series of stations, means for periodically delivering segments to the holders at one of said stations, means for imparting a step-by-step rotation of the holder at said station and means checking delivery of segments to the holder after delivery of a predetermined number thereto.

28. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, and means for rotating the holder at said station.

29. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, and means for imparting a step-by-step rotation to the holder.

30. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, and means for imparting a step-by-step rotation to the holder, wherein the steps of alternate rotations are staggered with relation to one another.

31. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, means for imparting a step-by-step rotation to the holder, wherein the steps of alternate rotations are staggered with relation to one another and means for checking delivery of the segments after delivery of a predetermined number thereof thereto.

32. In a multi-layer segmental rim-assembling machine, a plurality of rotatable holders each affording a channel of great circumferential length than the combined length of the segments comprising a layer of the rim, means for moving the holders step-by-step through a series of stations, means for periodically delivering segments to the holders at one of said stations, means for rotating the holder at said station and means for checking delivery of the segments after delivery of a predetermined number thereof thereto.

33. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, means for imparting a step-by-step rotation to the holder, and means for checking delivery of the segments after delivery of a predetermined number thereof thereto.

34. In a multi-layer segmental rim-assembling machine, a plurality of rotatable holders each affording a channel of greater circumferential length than the combined length of the segments comprising a layer of the rim, means for moving the holders step-by-step through a series of stations, means for periodically delivering segments to the holders at one of said stations, means for imparting a step-by-step rotation to the holder, wherein the steps of alternate rotations are staggered with relation to one another, and means for checking delivery of the segments after delivery of a predetermined number thereof thereto.

35. In a multi-layer segmental rim-assembling machine, rotatable holders, means for moving the holders step-by-step through a series of stations, means for periodically delivering segments to the holders at one of said stations and friction driving means tending to rotate the holders at said station.

36. In a multi-layer segmental rim-assembling machine, rotatable holders, means for moving the holders step-by-step through a series of stations, means for periodically delivering segments to the holders at one of said stations, friction driving means tending to rotate the holders at said station, and means for intermittently preventing rotation of the holders by said friction means.

37. In a multi-layer segmental rim-assembling machine, rotatable holders, means for moving the holders step-by-step through a series of stations, means for periodically delivering segments to the holders at one of said stations, friction driving means tending to rotate the holders at said station, means for intermittently preventing rotation of the holders by said friction means, and means checking operation of the segment delivery means after a predetermined number of segments have been delivered to a holder.

38. In a multi-layer segmental rim-assembling machine, rotatable holders, means for moving the holders step-by-step through a series of stations, means for periodically delivering segments to the holders at one of said stations, friction driving means tending to rotate the holders at said station, and means checking operation of the segment delivery means after a predetermined number of segments have been delivered to a holder.

39. In a multiple-layer segmental rim-assembling machine, rotatable holders, means for moving the holders step-by-step through a series of stations, means for periodically delivering segments to the holders at one of said stations, means for rotating the holder at said station, means yieldably mounting the holders upon the moving means, and means checking operation of the segment delivery means upon yielding of the holder.

40. In a multi-layer segmental rim-assembling machine, rotatable holders, means for moving the holders step-by-step through a series of stations, means for periodically delivering segments to the holders at one of said stations, friction driving means tending to rotate the holders at said station, means yieldably supporting the holders from said means for moving the same, and means checking delivery of segments to the holders upon yielding of the holder.

41. In a segment-assembling machine, a multi-station indexed carrier, rim holders carried thereby, means for delivering segments to the holders at one station of the carrier, means providing indexed rotation of the holders at said station and means checking operation of the segment delivering means through an index period after delivery of a predetermined number of segments to a holder.

42. In a segment-assembling machine, a multi-station indexed carrier, rim holders carried thereby, means for delivering segments to the holders at one station of the carrier, means providing indexed rotation of the holders at said station, means at a previous station for preliminarily indexing the holder for co-action with the last-named means, and means checking operation of the segment delivering means through an index period after delivery of a predetermined number of segments to a holder.

43. In a segmental rim-assembling machine, a rotatable table, means indexing rotation of the table, a plurality of rotatable heads carried by the table, supporting means for the heads yieldable under a predetermined pressure to permit the heads to move toward the table, a stamping press including an apertured die plate beneath which the heads are successively stationed by rotation of the table, and means providing indexed rotation of the heads while positioned beneath said die plate.

44. In a segmental rim-assembling machine, a rotatable table, means indexing rotation of the table, a plurality of rotatable heads carried by the table, supporting means for the heads yieldable under a predetermined pressure to permit the heads to move toward the table, a stamping press including an apertured die plate beneath which the heads are successively stationed by rotation of the table, means providing indexed rotation of the heads while positioned beneath said die plate, and means rendered effective by movement of a head toward the table while stationed beneath said die plate for checking operation of the stamping press.

45. In a segmental rim-assembling machine, a rotatable table, means indexing rotation of the table, a plurality of rotatable heads carried by the table, supporting means for the heads yieldable under a predetermined pressure to permit the heads to move toward the table, a stamping press including an apertured die plate beneath which the heads are successively stationed by rotation of the table, means providing indexed rotation of the heads while positioned beneath said die plate and means for preliminarily indexing each head for co-action with the first-named index mechanism therefor.

46. In a segmental rim-assembling machine, a rotatable table, means indexing rotation of the table, a plurality of rotatable heads carried by the table, supporting means for the heads yieldable under a predetermined pressure to permit the heads to move toward the table, a stamping press including an apertured die plate beneath which the heads are successively stationed by rotation of the table, means providing indexed rotation of the heads while positioned beneath said die plate, means rendered effective by movement of a head toward the table while stationed beneath said die plate for checking operation of the stamping press and means for preliminarily indexing each head for co-action with the first-named index mechanism therefor.

47. In a segmental body assembling machine, a holder to receive and hold the segments, a clamp element removably disposed in the holder and adapted to underlie segments placed therein, a second clamp element detachably engageable with the first-named clamp element and adapted to engage the upper surface of the segmental assembly and combining with the first-named clamp element to maintain the assembly in the assembled relation when removed from the holder, the clamping elements yielding to permit shifting of the segments upon the application of pressure thereto, and means movable axially of the holder to engage and eject the clamp from the holder.

48. In a segmental rim-assembling machine, a holder providing an annular channel to receive and hold the segments, said channel having a circumferential length greater than the combined length of the segments composing a layer of the rim, a clamp element removably disposed within the channel of the holder and adapted to underlie the segments placed therein, a second clamp element adapted to detachably engage the first-named clamping element and adapted to engage the upper surface of the rim, and means movable axially of the holder to engage and eject the clamp from the holder.

49. In a segmental rim-assembling machine, a holder providing an annular channel to receive and hold the segments, said channel having a circumferential length greater than the combined length of the segments composing a layer of the rim, a clamp element disposed within the channel of the holder and adapted to underlie the segments place therein, a second clamp element adapted to detachably engage the first-named clamping element and adapted to engage the upper surface of the rim, means for yieldably urging the clamping elements toward one another and means movable axially of the holder to engage and eject the clamp from the holder.

50. In a segmental rim-assembling machine, means for assembling relatively thin strips to produce a band of desired thickness, means for punching segments from the band, rotatable means upon which the segments are deposited as punched and means co-ordinating operation of the punching and rotatable means.

51. In a segmental rim-assembling machine, means for assembling relatively thin strips to produce a band of desired thickness, means for punching segments from the band, rotatable means upon which the segments are deposited as punched, means co-ordinating operation of the punching and rotatable means, a rotatable table upon which the rotatable means is mounted, and means for checking delivery of segments to the rotatable means and for advancing the table after delivery of a predetermined number of segments.

52. Means for assembling circular bodies which are composed of segmental layers, the segments of the layers being butt jointed, said means comprising a rotating receiver, segment feeding means, timing means co-operating with said rotating receiver and said segment feeding means constructed and arranged so that said feeding means deposits the segments upon a diameter greater than that of the body to be produced, said receiver comprising one element of a yieldable clamp for maintaining said segments in the position in which they are delivered to the receiver during and after their removal from the receiver.

53. Means for assembling circular bodies which are composed of segmental layers, the segments of the layers being butt jointed, said means comprising a rotating receiver, segment feeding means, timing means co-operating with said rotating receiver and said segment feeding means constructed and arranged so that said feeding means deposits the segments upon a diameter greater than that of the body to be produced, said receiver comprising one element of a yieldable clamp for maintaining said segments in the position in which they are delivered to the receiver during their removal from the receiver, said timing means including a part varying the effective interval of deposit of the segments in said receiver after the delivery to the receiving means of the segments comprising a layer whereby the segments of each layer are staggered with relation to one another.

54. In a layered segmental rim-assembling machine, means for assembling relatively thin strips to produce a band of desired thickness, means for punching segments from the band, a rotatable holder in which the segments are deposited as punched, said holder having a segment-receiving groove of a length greater than the combined length of the segments composing a layer of the rim, means for indexing rotation of the holder and means coordinating operation of said indexing and punching means to place the segments in the holder with the adjacent ends thereof circumferentially spaced and in confronting relation.

55. In a segmental rim-assembling machine, assembling rims comprising layers of relatively thick segments, a holder providing an annular channel to receive and hold the segments, said channel having a circumferential length greater than the combined length of the segments composing a layer of the rim, and means for depositing segments in said channel in layers with adjacent ends of the segments of each layer in spaced non-lapping relation.

56. In a segmental rim-assembling machine, a rotatable head, opposed walls extending upwardly from said head and defining an annular channel, one of said walls being flexible, the upper ends of said walls being normally spaced from one another a distance less than the radial depth of the segments to be assembled.

FRANK H. BENGE.